United States Patent [19]
Klieber et al.

[11] Patent Number: 5,603,553
[45] Date of Patent: Feb. 18, 1997

[54] BICYCLE WHEEL WITH DISK COVER

[75] Inventors: Jochen Klieber, Tacherting; Reinhold Wuttke, Arnsberg, both of Germany

[73] Assignee: F. W. Brokelmann Aluminiumwerk GmbH & Co., Ense-Hoingen, Germany

[21] Appl. No.: 244,696

[22] PCT Filed: Dec. 7, 1992

[86] PCT No.: PCT/EP92/02824

§ 371 Date: Jul. 28, 1994

§ 102(e) Date: Jul. 28, 1994

[87] PCT Pub. No.: WO93/11950

PCT Pub. Date: Jun. 24, 1993

[30] Foreign Application Priority Data

| Dec. 7, 1991 | [DE] | Germany | 9115199 U |
| Jan. 24, 1992 | [DE] | Germany | 42 01 953.2 |
| Sep. 21, 1992 | [DE] | Germany | 42 31 539.5 |

[51] Int. Cl.⁶ .................................................. B60B 7/00
[52] U.S. Cl. ........................... 301/37.41; 301/37.36
[58] Field of Search ....................... 301/37.1, 37.35, 301/37.36, 37.41, 55, 95, 96, 97, 98, 31.32, 31.33

[56] References Cited

U.S. PATENT DOCUMENTS

| 1,373,889 | 4/1921 | Johnston | 301/37.41 X |
| 2,127,598 | 8/1938 | Horn et al. | 301/37.36 |
| 2,631,066 | 3/1953 | Horn | 301/37.36 |
| 3,004,798 | 10/1961 | Tylle | 301/37.1 |
| 3,052,965 | 9/1962 | Lyon | 301/37.36 X |
| 4,620,749 | 11/1986 | McEachern | 301/37.41 |
| 4,682,821 | 7/1987 | Strazis | 301/37.1 |
| 4,712,838 | 12/1987 | Berg et al. | 301/37.1 |
| 4,836,615 | 6/1989 | Berg et al. | 301/37.41 |
| 5,056,630 | 10/1991 | Fujii et al. | 301/95 X |
| 5,131,726 | 7/1992 | Collins | 301/37.42 X |
| 5,131,727 | 7/1992 | Johnson | 301/37.41 |
| 5,228,756 | 7/1993 | Krampera | 301/95 X |

FOREIGN PATENT DOCUMENTS

| 219983 | 1/1959 | Australia | 301/37.36 |
| 0223164 | 5/1987 | European Pat. Off. . | |
| 0346923 | 12/1989 | European Pat. Off. . | |

*Primary Examiner*—Russell D. Stormer
*Attorney, Agent, or Firm*—Tilton, Fallon, Lungmus & Chestnut

[57] ABSTRACT

A bicycle wheel has a plurality of spokes arranged between a continuous profiled rim and a hub (5). At least one covering disk (6) is releasably secured to the wheel in order to provide it with a lateral cover. In order to obtain an easy to release and aerodynamically optimum cover, at least one continuous snapped groove (7) into which the covering disk can snap-in is shaped in the side of the rim profile.

18 Claims, 5 Drawing Sheets

BICYCLE WHEEL WITH DISK COVER

GENERAL DESCRIPTION

The present invention relates to a bicycle wheel with a plurality of spokes extending between a hub and a rim to which at least one disk cover is removably attached in order to provide the wheel with a lateral fairing.

All types of bicycles (touring, racing, mountain bikes, etc.) have in common that the energy produced by the rider is largely used to overcome the air resistance, the driver's frontal area making the biggest contribution to drag, followed by the wheels.

In order to reduce the effect of the wheels on air resistance, various embodiments of fully integrated disk wheels have been introduced. Fully integrated disk wheels are completely covered on both sides, the disk cover serving as a load carrying element for both tension loads and other kinds of loads during the ride.

Compared to spoked bicycle wheels, the disadvantage of the fully integrated disk wheels is their distinctly poor ability to absorb road shocks. In addition, their rolling performance is noticeably rougher than that of spoked wheels. Furthermore, due to the disk's stiffness, fully integrated disk wheels produce considerably more noise during the ride.

In order to transfer the aerodynamic advantages of a fully integrated disk wheel to a conventional spoked wheel, the U.S. Pat. No. 4,712,838 for instance recommends to provide the spokes adjacent to the rim with a number of clips by which a disk cover is held in place serving as a lateral fairing of the bicycle wheel.

Another method already in use employs a plastic film which is supported at the hub, stretched and glued at the outer edge to the rim of the wheel, in particular to the rim side walls.

Both the clip disk cover as well as the adhesively joined plastic film are usually fitted to both sides of the wheel, the spokes remaining inside the fairing.

The disk cover as disclosed in the U.S. Pat. No. 4,712,838 has the drawback of an air gap formed between the disk edge and the rim, thereby increasing the air resistance over that of the fully integrated disk wheel. In addition, changing of the disk cover requires undoing numerous fastening elements. Since these are simply clipped to the spokes, they can get lost. In this case, the disk cover is no longer uniformly supported along its circumference by the wheel.

Regarding the adhesively joined plastic film cover, damage of the plastic film requires its removal costing time and money. To inflate the tire, access to the valve is rather difficult in both cases.

Therefore, it is the intent of the present invention to improve the removable fastening of the lateral wheel cover by simultaneously providing the cover with a snug fit on all rim shapes omitting edges, bolts, air gaps or the like.

For a bicycle of the kind disclosed in claim 1 of the U.S. Pat. No. 4,712,838, the present invention offers a satisfactory answer to the above intent by providing the rim laterally with at least one circumferential catch groove into which the disk cover is engaged.

On the rim the catch groove is formed between the spoke hole side and the side wall of the rim. A catch groove of this kind can be formed on all types of rims, as for instance aluminum rims, stainless steel rims, hollow cross-section rims or concave flange rims. Catch groove fitted rims can therefore be used with both wire reinforced tires and folding tires. The disk cover disclosed by the present invention is simply clipped to the hub and then inserted in the catch groove along its outer edge. Since the catch groove is formed as an integral part of the rim, no additional fastening elements are needed. Neither air gaps nor edges are produced between the disk cover and the rim and/or rim side wall. The disclosure by the present invention offers a complete lateral wheel cover of optimum aerodynamic design as is usually provided only by the fully integrated disk wheel. At the same time, the bicycle wheel disclosed by this invention offers all advantages of the spoked wheel. All hub and spoke types in use for bicycles are suitable. Instead of conventional wire spokes, tensioned high-strength fibers, made of Kevlar, for instance, can be used to connect the hub and the rim.

By completely covering the bicycle wheel, an enclosed interior is obtained which is most favorably protected against humidity, dirt and wear from entering road debris or the like.

At the same time, the rim side walls can be fully used as braking surfaces in contrast to the plastic film cover which is glued to the rim side walls. In addition, ease of maintenance and access to the valve of the spoked wheel is maintained in contrast to the fully integrated disk wheel and/or the adhesively joined plastic film cover.

A favorable embodiment of the present invention consists of an essentially circular hoop and a cover which is stretched over and retained by the hoop. The diameter of the hoop is of a size which permits the disk cover to be engaged easily in the catch groove and to be held firmly therein during the ride. The so formed wheel covers are easy to handle and assembled. The center opening of the cover is provided with a clip ring by means of which the disk cover is installed on the hub. The clip ring fits on the hub flange into which the spokes are inserted.

A preferred embodiment of the present invention consists of a recessed catch groove located in the section between the spoke hole wall and the side wall of the rim in which the disk cover having an edge reinforcement is engaged and held. This extremely easy method of installation provides a sealed joint between the disk cover edge and the rim, keeping the outside surfaces of the rim smooth.

By using an elastic edge reinforcement in the edge of the cover, preferably of circular or tubular cross section, a particularly simple and elastic joint between the rim and disk cover is obtained enabling quick installation and removal of the disk cover.

On the inside, the outer edge of the disk cover can be provided with a ring-shaped web by means of which it is engaged in a respective groove of the rim.

A simple embodiment of the present invention consists of a catch groove having a semicircular shape enabling the disk cover to be securely held in place and to be easily removed.

Bicycle rear wheels are offset at the hub in order to allow for the accommodation of multi-speed gear clusters on one side of the wheel. For rims of offset wheels it is of advantage to have the rim side wall on the gear cluster side generally parallel to the wheel centerline, while in the direction of the hub the rim side wall on the opposite side of the wheel is outwardly inclined at an acute angle with the centerline. This configuration enables the disk cover to be installed generally vertically on the sprocket side without interfering with the gear clusters. Whereas on the opposite side of the wheel, the disk cover is installed at an inclined angle.

In this context, it is of advantage to have the inclination of the rim side walls parallel with the inclination of the cone-shaped configuration of the spokes.

Furthermore, it is advantageous for the installation of the disk cover to have the opening of the catch groove in the straight rim side wall face downward toward the hub, while the opening of the catch groove in the inclined rim side wall is swiveled or inclined outward.

It is of further advantage when the inclined angle of the catch groove and the angle of inclination of the rim are essentially identical. In this case, extending from the inclined rim side wall at the side wall's angle of inclination, the disk cover will cover the wheel down to the hub in such a way that there will be neither edges nor irregularities in the section between rim and disk cover.

In order to enable the spokes to be inserted in the spoke holes between the catch grooves with ease and at a certain angle of inclination, it is of advantage to have the spoke holes in the rim, especially those belonging to the spokes of the gear cluster side, offset from the centerline toward the .inclined rim side wall. In this manner, the spokes can be arranged at a reduced angle of inclination.

A preferred embodiment of the present invention provides for the spoke holes to be arranged offset from the rim centerline on the side of the inclined rim side wall. In addition, it is of advantage to have the spoke inserted in the hole closer to the inclined rim side wall at a greater angle with the spoke hole centerline than the spoke inserted in the hole closer to the rim centerline. The spoke hole centerline is essentially parallel to the rim centerline and offset toward the inclined rim side wall.

In order to improve the stiffness of a hollow cross-section rim, especially with an asymmetric configuration, it is of advantage to provide the hollow section with an essentially vertical reinforcing rib.

In addition it is advantageous to have the cover stretched over the hoop provided with a hollow casing on its inside into which a cord is incorporated for tightening the cover. By means of the tightening cord the cover can be easily installed on and removed from the hoop. It is easy to change the cover material, the color of the cover or the cover for cleaning.

Depending on the cover material used, the tightening cord can be omitted. A thermal treatment can be applied to fasten the cover by shrinking it on.

Another embodiment of the present invention consists of a cover which is glued to the hoop. In this case, the hoop is a flattened ring, one flat side being used to fasten the cover by adhesive bonding.

For the cover material a fabric, a film, a fabric-backed fabric, a coated fabric or the like can be used. The choice of the material depends on the conditions of the intended use, i.e., weather, wear or the like. The hoop is preferably made of a metallic or composite material. Due to its elasticity and low weight, titanium is a good choice for the hoop. In addition to a flexible material, a composite material can be used for the disk cover. In this case, the disk's outer edge is provided with the hoop profile making cover and hoop an integral part.

Another embodiment of the present invention consists of a profiled disk located on the inside of the wheel cover concentric with the hub of the wheel. The disk serves for contouring the wheel cover, thereby keeping the spokes from pushing through the wheel cover.

For easy access to the valve in the rim, it is of advantage to provide the wheel cover with an opening in the valve area through which the tire pump can be inserted.

In addition, it is of advantage to provide a device at least for expanding the hoop inside the access opening. There is a gap on the hoop and the expanding device is movably mounted to the free ends of the hoop which confine the gap. By moving the expanding device the diameter of the hoop is adjusted.

For installation, the wheel cover is simply inserted into the respective catch groove and fixed in position by expanding the hoop. For removal of the wheel cover, the order is reversed. Being actuated, the expanding device pushes the free ends of the hoop apart in the direction of the circumference. For removal of the wheel cover, the expanding device is simply released so that, due to the hoop's elasticity, the free ends of the hoop meet.

An interesting embodiment of the expanding device consists of a spring element acting in the direction of the hoop's circumference. For installation of the wheel cover, the spring element is compressed by hand. As soon as the hoop has engaged the catch groove, the spring element is released, thereby expanding and fixing the hoop in position.

Another embodiment of the expanding device consists of a rotating eccentric disc acting on the free ends of the hoop which are bent inward in a generally radial direction. By simply turning the eccentric disk, the free ends adjoining the disk are expanded, whereby the hoop is fixed in position in the catch groove.

A still further favorable embodiment of the present invention comprises the free ends of the hoop which are bent inward in a generally radial direction and away from each other as well as an expanding device which consists of a wedge designed to slide along the free ends of the hoop. The free ends are increasingly spaced apart in the direction of the center of the disk cover so that they are pushed apart when the wedge is moved toward the rim. By moving the expanding wedge along the free ends of the hoop, the disk cover can be fixed in position and/or removed in an easy manner.

In order to form a simple valve access opening and to hold and secure the free end of the loop in an easy manner, it is of advantage to provide an essentially U-shaped elastic frame to confine the access opening in the disk cover and to insert the free ends of the hoop in the U-legs of the frame, while the expanding wedge is slidingly arranged between the U-legs. With the help of the frame, the disk cover is favorably protected against damage or tearing at the access opening. By securing the free ends inside the U-legs, they are not in direct contact with the cover, thereby being prevented from damaging the cover. Moreover, damage to the free ends of the hoop is thereby avoided. The expanding wedge being arranged between the U-legs, the hoop can be easily adjusted by sliding the wedge toward the rim.

In this context, it is of particular advantage to have the expanding wedge and the U-legs provided with a tongued and grooved joint. For example, the expanding wedge can be fitted with two lateral grooves into which are engaged the respective tongues on the inside of the U-legs. In this manner, the expanding wedge is securely held in place, especially in its fully expanded position when it is tangent to the rim. Having been released from its position, the expanding wedge can be removed from the frame depending on the depth of the engagement.

In order to easily secure the expanding wedge in its expanded position, it is of advantage to provide the U-legs with a lug. Provided with corresponding projections, the expanding wedge engages this lug. It is safely secured due to the elasticity of the frame.

In order to easily seal the access opening, it is of advantage if a lid is pivotably fastened to the end of the expanding wedge opposite the rim. In its fully extended position, the expanding wedge and the lid will seal the access opening completely.

Furthermore, it is of advantage to arrange the lid and the expanding wedge flush with the wheel cover, thereby avoiding edges which increase drag.

An easy way to fasten the lid is to fit it with a snap nose which engages the web of the U-frame by gripping around it, thereby holding the lid in position.

For easy handling of the lid, it is of advantage to provide it with a fingerhole. By inserting a finger, for example, the lid is pivoted outward, thereby also allowing the removal of the expanding wedge from its expanded position.

The rim is jointed to a circular hoop with a closely fitting plug inserted at the joint. The thereby increased mass at this point of the rim causes a certain imbalance. In order to restore wheel balance to a certain extent, it is advantageous to locate the valve access opening diametrically opposed to the rim joint.

Furthermore, it is favorable, if the U-shaped frame, the expanding wedge, and the lid supply essentially the weight necessary to balance the wheel which is unbalanced by the rim joint. By doing so, there is no need for additional balancing of the wheel.

For easy removal of the completely closed hoop from the catch groove, a preferred embodiment of the hoop is provided with at least one indentation oriented away from the catch groove, which helps to remove the hoop as if with a lever.

In order to facilitate levering the hoop, it is of further advantage to place elastic supporting pieces at intervals between the catch groove and the hoop. In this way, the hoop will react to a radially applied lever by moving outward in radial direction, thereby facilitating its removal.

For spring-actuated closing of the lid, it is of advantage to provide a spring element between the lid and the expanding wedge. The lid is closed through the force of this spring element and stays closed when a ride is started. In this way, starting a ride with an open lid is prevented and safety is increased.

In order to improve load transfer and to reduce peak loads, a preferred embodiment of the present invention consists of beveling the rim joint faces. The application of a beveled rim joint is not confined to the rim shapes depicted herein. Beveling of rim joints can be used on any type of rim, such as aluminum rims, stainless steel rims, hollow cross-section rims, concave flange rims or the like.

In order to affect neither the radial stiffness of the bicycle wheel nor the performance of the brakes, it is also of advantage, if the beveled face plane of the joint runs across the rim section between the rim side walls, the plane's normal meeting the circumferential line at an acute angle. The joint face is essentially perpendicular to the upper or lower side of the rim.

In order to further improve stability, it is of advantage to incorporate at least one socket inside the hollow section of the rim, extending at equal length to either side of the rim joint in the direction of the circumference.

Another advantage is to place the socket face parallel with the rim joint plane. By doing so, peak loads in the joint area are uniformly distributed between the joint and the socket.

It is of great advantage, if the hollow section of a rim which has been partitioned by a reinforcing rib is fitted with one socket each for each subsection.

In order to improve the braking performance of the rim, the wet rim in particular, it is of advantage to coat the rim side walls with a fine-grain ceramic coating. A ceramic coating of this kind can be applied to any known bicycle wheel. Plasma spraying is one of the methods used.

Due to the different elastic behavior of the ceramic coating and the rim, the ceramic coating can chip. To prevent chipping as far as possible, it is of advantage to provide the ceramic coating with a stress-relieving gap concentric with the hub. In general, the stress-relieving gap is located midway on the rim side wall, its thickness ranging from 0.3 to 0.8 mm.

The disclosures and preferred embodiments of the present invention are further described and depicted by the following figures.

DETAILED DESCRIPTION

Figure 1:
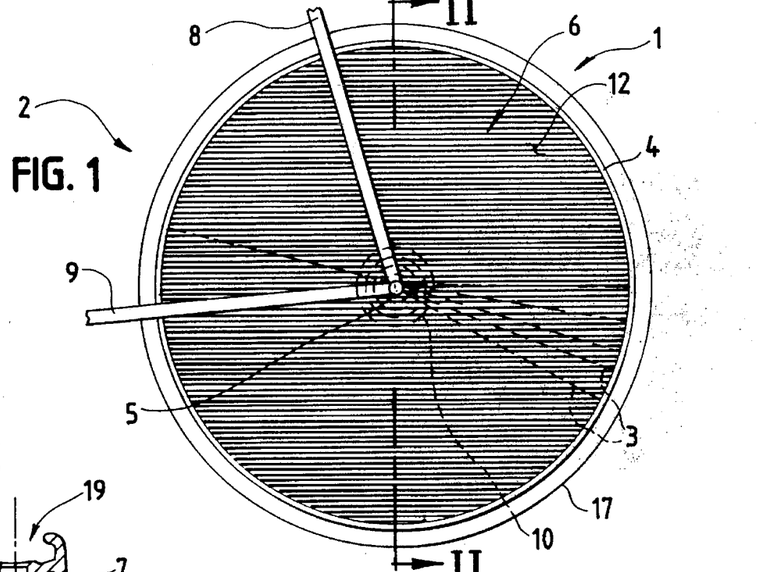
FIG. 1 discloses a side view of a rear bicycle wheel.

FIG. 1 shows a partial side view of a bicycle 2. A rear wheel 1 is rotatingly mounted to the seat stay 8 and the chain stay by means of a hub 5. Not shown are the saddle to which the seat stay 8 extends and the crank axle to which the chain stay 9 extends.

A great number of spokes 3 are arranged between the hub 5 and the circular rim 4. For convenience, only a few spokes are shown in FIG. 1. The hub 5 is located in the center of the circular rim 4. On its circumference, the rim 4 is fitted with the tire 17.

Concentric with the hub 5, a multi-speed gear cluster is provided. Between the hub 5 and the rim 4, a disk cover 6 having a cover 12 is provided in order to cover the side of the wheel.

Figure 2:
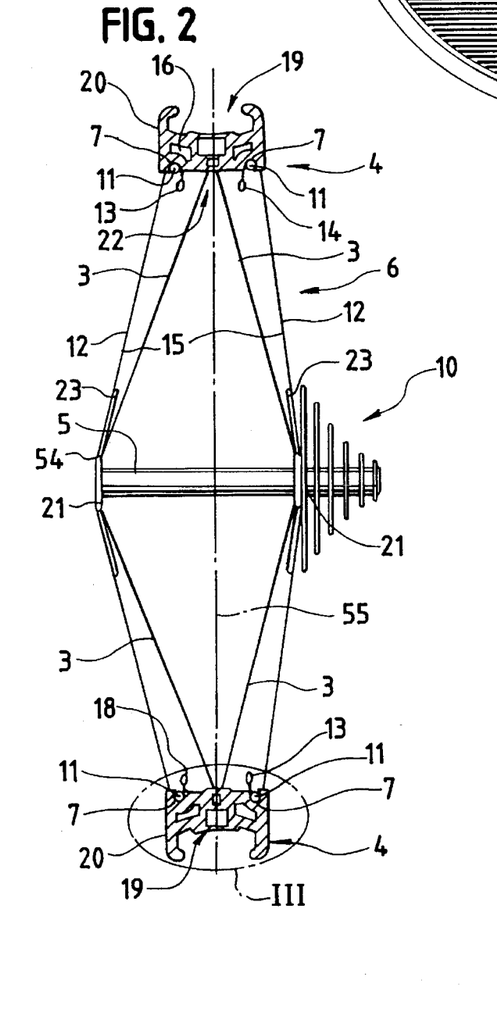
FIG. 2 discloses line II—II of FIG. 1 in cross-section.

FIG. 2 shows a cross-section of the bicycle wheel 1 along line II—II of FIG. 1. For convenience, the tire 17 mounted on the rim 4 of FIG. 1 has been omitted in FIG. 2.

Both sides of the bicycle wheel are fitted with the disk covers 6 between the hub 5 and the rim 4. The disk covers are mounted to the wheel by inserting their outer edge by means of the hoop 11 into the catch groove 7 of the rim 4. The catch grooves 7 are located on the spoke hole side 22 directly adjacent to the rim side wall 20. The disk cover is provided with a cover 12.

The cover 12 extends from the hub ring 54 holding the disk cover at the hub 5 to the hoop 11. It is stretched around the hoop 11 inserted in the catch groove 7 and is finished off with a peripheral casing 13 which contains the tightening cord 14. On the inside 15 of the disk cover 6, profiled disks 23 are arranged concentric with the hub ring 54. The diameter of these disks is greater than that of the hub ring 54. The disks 23 serve to keep the cover 12 at a distance from the spokes.

The spokes 3 extend between the hub flange 21 and the spoke holes 18 located on the centerline of the rim 4. The method used to insert the spokes 3 in the hub flange 21 and to tighten them in the rim spoke holes 18 by means of nipples is well known to those skilled in the art. Extending from the hub flange 5, the spokes are more strongly inclined toward the vertical 55 than is the cover 12 of the wheel disk 6. Thereby all the spokes 3 stay inside the two lateral disk covers 6.

The tire is mounted on the bed 19 of the rim 4 opposite the spoke hole side 19 and separated from it by the hollow cross section 16. The rim bed 19 and the spoke hole side 22 are interconnected by an aperture which enables the spokes 3 to be fastened in the spoke holes 18. On one side of the bicycle wheel 1, the hub 5 which projects beyond the disk cover 6 is fitted with a gear cluster 10. On this gear cluster side of the wheel, both the spokes 3 and the cover 6 are less inclined toward the vertical 55 than those on the opposite side of the wheel 1.

Figure 3:
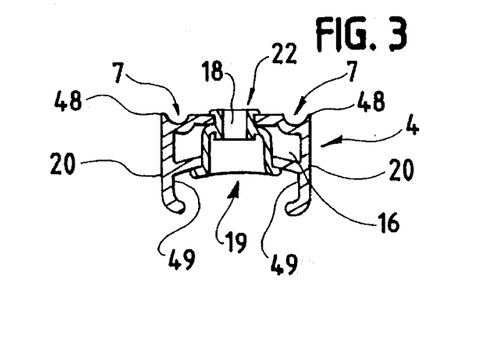
FIG. 3 discloses an enlarged view of detail III of FIG. 2.

FIG. 3 shows an enlarged view of detail III of FIG. 2. For convenience, both the spokes 3 and the disk covers 6 of FIG. 2 are omitted.

The rim 4 comprises two fairly straight rim side walls 20 spaced apart. In the section between the spoke hole side 22 and the rim side wall 20, the essentially semicircular catch groove 7 is located. In this section, the rim side walls are extended into a lip 48 which confines the catch groove 7. The spoke hole 18 is located on the centerline between the catch grooves 7 and between the rim side walls 20. It is connected to the rim bed 19. The hollow section 16 extends between the rim bed 19 and the spoke hole side 22. The rim bed 19 is laterally confined by the rim side walls 20 which, fitted with hooked edges, serve as mounting supports 49 for tires, wire-reinforced tires for instance.

Figure 4:
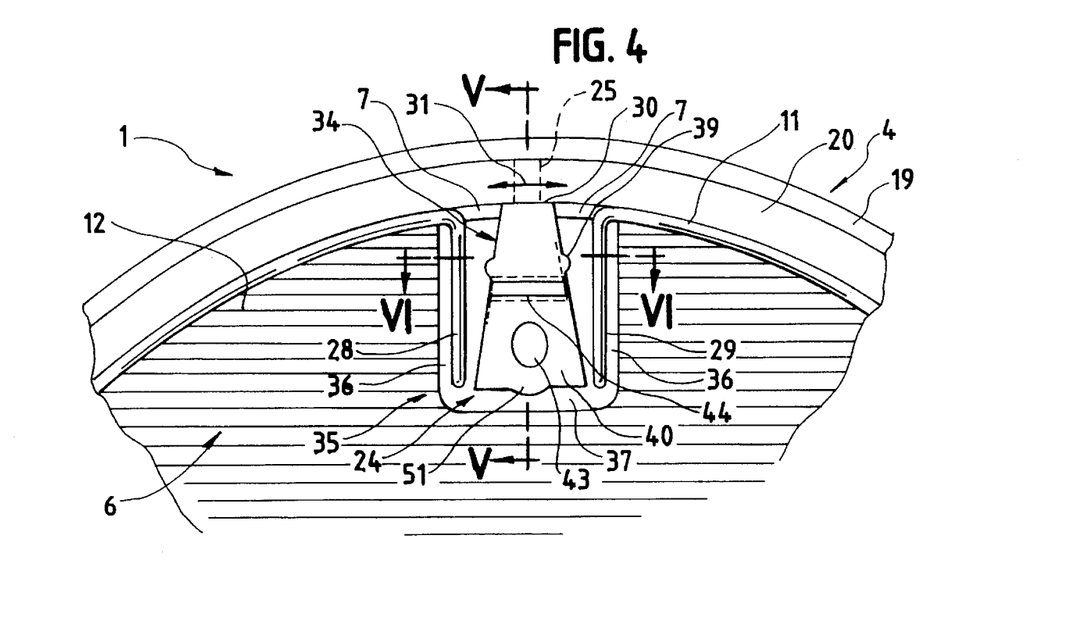
FIG. 4 discloses a side view of another embodiment of the present invention with an access opening in the wheel cover.

FIG. 4 depicts the bicycle wheel 1 with the rim 4 and the disk cover 6. Located in the rim bed 19 is the valve 25. It projects from the spoke hole side of the rim 4 and is accessible through the opening 24.

The hoop 11 is inserted in the peripheral catch groove 7, partially disappearing therein. In the vicinity of the valve, there is a gap in the hoop 11 so that the catch groove is visible. The free ends 28 and 29 of the hoop 11 are bent toward the center of the wheel and are more or less parallel to each other.

In order to confine the valve access opening 24 and the free ends 28 and 29, an essentially U-shaped frame 35 is provided within the cover 12 of the disk cover 6. Its U-legs 36 point toward the rim 4, the U-web 37 being arranged at a right angle to the free ends 28 and 29. The U-legs 36 and the free ends 28 and 29 are of essentially the same length, the free ends being inserted into the opening of the U-legs 36.

The U-legs 36 increase in thickness toward the rim 4, the legs being essentially straight on the outside, but sloped on the inside approaching each other toward the rim 4.

On the inside of the opposing U-legs 36, a wedge-like expanding device is slidably arranged, its width decreasing in the direction of the rim 4. By sliding the wedge 34 radially toward the circumference of the wheel 1, the U-legs 36 including the free ends 28 and 29 of the hoop 11 are expanded in the direction of the circumference 31. When the end 30 of the wedge comes into a close fit with the catch groove 7, it assumes its fully expanded position. In order to secure this position, the inside of the U-legs 36 are fitted with lugs 39 which interlock with the respective projections of the wedge 34.

A lid 40 is provide between the expanding wedge 34 and the web 37 of the U-shaped frame. It seals the valve access opening 24 in conjunction with the expanding wedge 34.

The lid 40 is fastened to the wedge 34 by means of a pin 41 enabling the lid 40 to pivot. The spring element 44 is arranged coaxially with the pin. It actuates the lid 40 to close in the direction of the web 37 of the U-shaped frame.

For handling, the lid 40 has a fingerhole located approximately in the center thereof. The lid 40 is provided with a small tab 51 shaped to fit the U-web 37.

Figure 5:
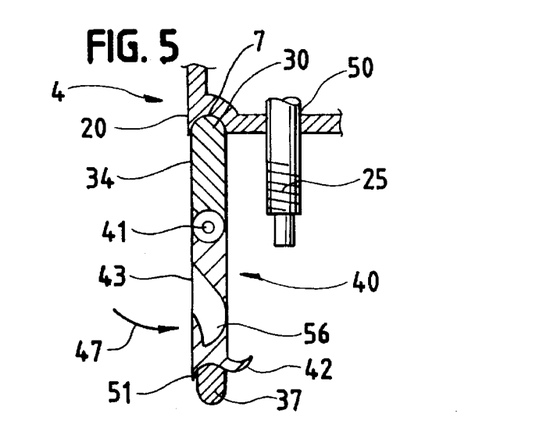
FIG. 5 discloses line V—V of FIG. 4 in cross-section.

FIG. 5 shows a cross section along line V—V of FIG. 4. The valve 25 is located in the valve stem hole 50 of the rim 4. Similar to the spoke holes in FIG. 3, the valve stem hole 50 is positioned on the centerline of the rim 4.

The outer surfaces of the expanding wedge 34 and the lid 40 are shaped to be flush with the rim side walls 20. The end 30 of the expanding edge 34 is engaged in the catch groove 7. The pin 41 is situated between the lid 40 and the expanding wedge 34.

The position of the expanding wedge 34 shown in FIG. 5 depicts the lid 40 in its fully closed position. The small tab 51 fits the web 37 of the U-shaped frame 37 on one side, while the snap nose 42 projecting from the lid 40 engages the web 37 on the opposite side. By means of the spring element 44 shown in FIG. 4, the lid 40 is forced to close in the direction 47.

The fingerhole 43 is positioned on the outside of the lid 40 approximately midway between the small tab 51 and the pin 41. It gives access to a finger rest 56 inside the lid 40 which is oriented toward the web 37 of the U-shaped frame.

Figure 6:
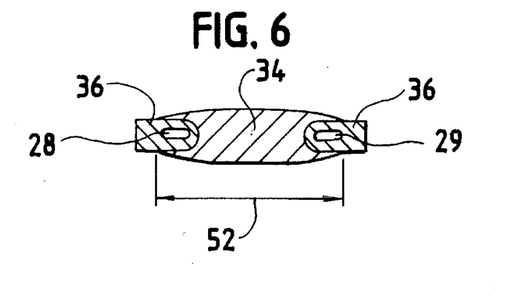
FIG. 6 discloses line VI—VI of FIG. 4 in cross-section.

FIG. 6 shows a cross section along line VI—VI of FIG. 4. The expanding wedge 34 has a flat oval shape and the width 52. The sides are provided with grooves in order to engage the U-legs 36. The free hoop ends 28 and 29 are fed into the U-legs 36. They have a flat oval cross-section in order to be prevented from twisting inside the U-legs 36.

The width 52 of the expanding wedge 34 is less than that of the valve access hole 24 at the level of the fingerhole 43 as shown in FIG. 4. Therefore, the expanding wedge 34 together with the lid 40 is removable from the valve access hole 24, if pushed far enough toward the web 37 of the U-shaped frame.

Figure 7:
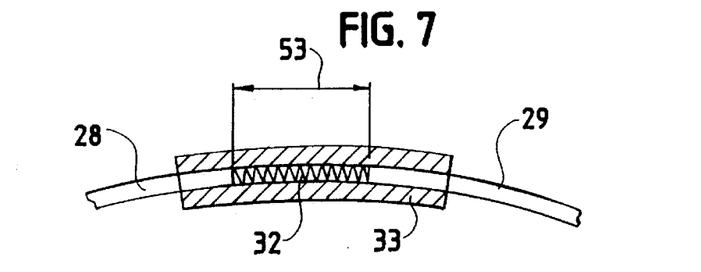
FIG. 7 discloses another embodiment of the expanding device of the present invention.

FIG. 7 depicts another embodiment of an expanding device. The free hoop ends 28 and 29 confine a gap of the width 53 and are facing each other. A spring element 32 is located between the free ends by means of a sleeve 33. The free ends 28 and 29 are partially fed into the sleeve 33 and can be adjusted in relation to it.

Figure 8:
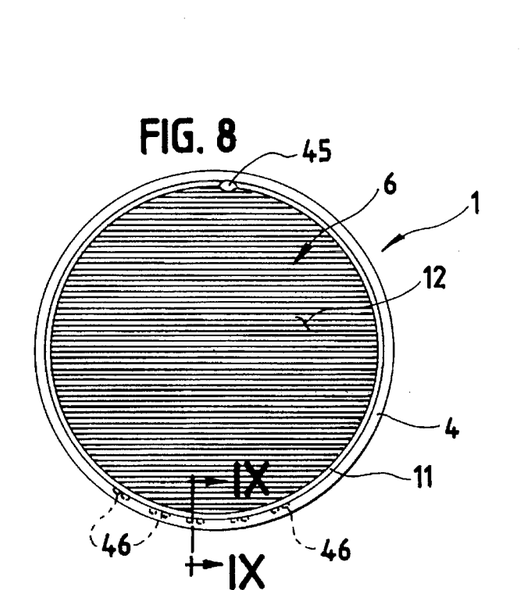
FIG. 8 discloses a side view of another embodiment of the present invention.

FIG. 8 depicts another embodiment of the bicycle wheel 1 as disclosed by the present invention. The hoop 11 retaining the cover 12 is inserted in the catch groove of rim 4, thereby covering the bicycle 1 laterally with the disk cover 6. At one point of its circumference, the hoop 11 is provided with a dent 45 for handling. It is formed by bending a segment of the curved hoop 11 to the inside of the hoop.

A further embodiment of the present invention permits to place a number of elastic supporting elements 46 at intervals around the catch groove.

Figure 9:
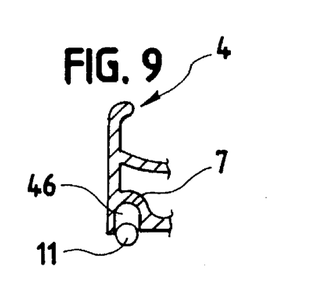
FIG. 9 discloses line IX—IX of FIG. 8 in cross-section.

FIG. 9 shows a cross section along line IX—IX of FIG. 8 to illustrate the supporting elements. A supporting element 46 is located in the catch groove 7 of the rim 4, thereby providing a resilient support for the hoop 11.

Figure 10:
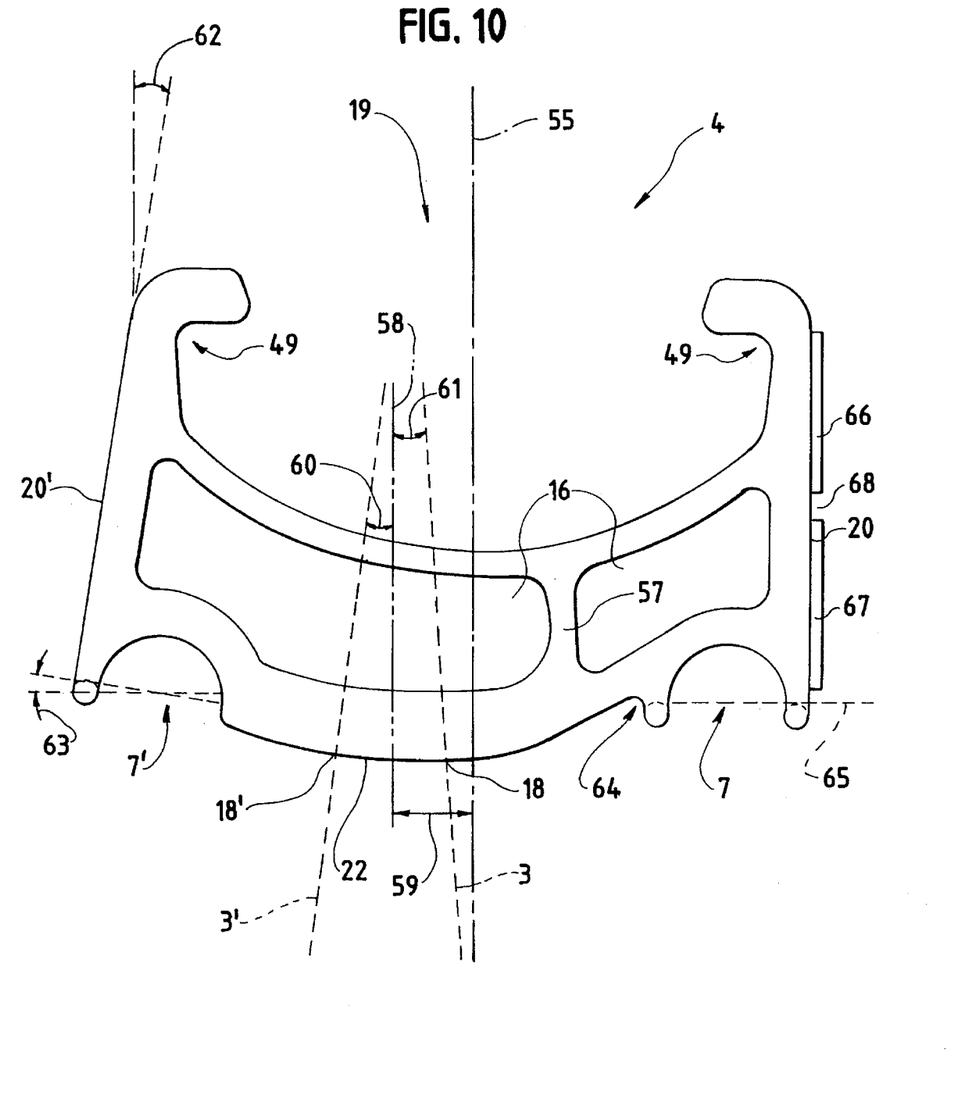
FIG. 10 discloses another embodiment of the present invention relating to FIG. 3.

FIG. 10 shows another embodiment of the rims disclosed by the present invention and the description of FIG. 3. The rim 4 is provided with the rim bed 19 serving as a mount for a tire which is not shown. According to the description of FIG. 3, the tire is mounted between the hooked edges of the rim walls 20 and 20' and held in place by the tire mounts 49.

The vertical centerline 55 is shown to extend between the upper part of the rim side walls or tire mounts 49 respectively.

The rim side wall as shown on the right side of FIG. 10 lies essentially parallel to the centerline 55, whereas the inclined rim side wall 10', upon extension of its line of inclination, makes an acute angle 63 with the centerline 55. In the direction of the hub as shown in FIG. 2, the rim side wall 20' is inclined outward. On the side of the essentially parallel rim wall 20, the multi-speed gear wheels 10 are mounted on the hub 5 as shown in FIG. 2.

As a whole, the rim 4 is asymmetric in relation to the vertical centerline 5. The catch groove 7 to the right side of the centerline 55 has an essentially semicircular cross section. The pertaining center and diameter of the semicircle are located on the horizontal 65. The catch groove 7' to the left side of the centerline 55 has also as essentially semicircular cross section. The pertaining center and diameter of the semicircle are located on a line which is inclined upward relative to the horizontal 65 at the angle 63. The center of the catch groove circle is located at the intersection between the horizontal 65 and the line inclined at the angle 62. Both catch grooves 7 and 7' are extended beyond the horizontal line 65. The extensions are essentially tangent to the circle line of the catch groove and are given a curving for integration with the spoke hole side 22 nd the rim side walls 20 and 20'.

The hollow cross section 16 is located between the catch grooves 8 and 7' the spoke hole side 22 and the rim bed 19. On the side of the catch groove 7, to the right of the center line 55, the hollow section is reinforced with an essentially vertical rib 57.

The reinforcing rib 57 divides the hollow section into two parts. The resulting smaller hollow section is located above the catch groove 7, the larger hollow section above the catch groove 7', both extending across the spoke hole side 22 of the rim. The wall thickness of the spoke hole side below the larger hollow section is greater than that below the smaller hollow section. There is a transitional zone under the reinforcing rib 57. On the spoke hole side 22 adjacent to the catch groove 7, a recess is provided in order to save material.

The spoke holes 18 and 18' are offset from the vertical centerline 55 towards the catch groove 7'. They are successively arranged in the rim according to common practice. The spoke 3 enters the spoke hole 18 at the acute angle 61 with the spoke hole centerline 58 being given an outward inclination on its way toward the hub. The spoke 3' enters the spoke hole 18' at the acute angle 60 with the spoke hole centerline 58 being given an outward inclination on its way to the hub. The spokes 3 and 3' diverge in the direction of the hub 5 shown in FIG. 2. They are hooked in the hub flange 21 according to common practice.

The spoke hole centerline 58 lies parallel to the vertical centerline 55 from which it is offset at a distance 59 toward the inclined rim side wall 20'. The acute angle 60 enclosed between the spoke 3' and the spoke hole centerline 58 is slightly bigger than are the acute angles 62 and 63 which are equal. The size of the angles depend among other things on the wheel diameter and the offset 59 between the spoke hole centerline 58 and the offset 59 between the spoke hole centerline 58 and the vertical rim centerline 55. For the embodiment of the present invention disclosed in FIG. 10, the angle 60 is essentially twice as big as the angle 61.

The ceramic coating 66 and 67 is shown to cover the surface of the rim side wall 20. It is divided into two equal sections which are spaced apart by the stress-relieving gap 68 by 0.3 to 0.8 mm. The circumferential gap 68 is located midway on the rim side wall 20, the coating sections extending equally far to either side of the gap in the direction of the vertical centerline 55.

For convenience, the corresponding ceramic coating on the opposite rim side wall 20' is omitted in the figure.

Figure 11:
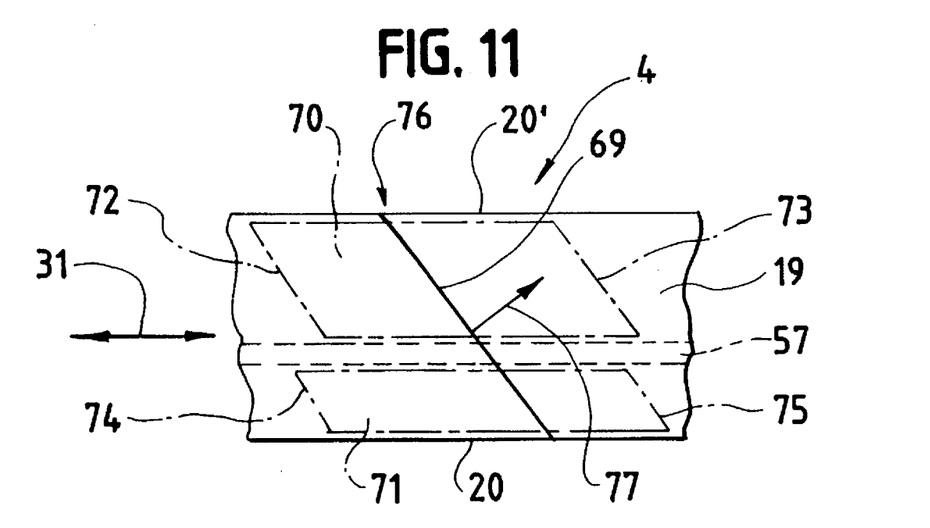
FIG. 11 discloses a simplified drawing of a rim as seen from above.

FIG. 11 shows a simplified view of the rim 4 depicted in FIG. 10 as seen from above in the direction of the rim bed 19. It illustrates the joint 76 of the rim 4. The joint is defined by the face plane 76 which extends across the rim 4 between the two rim side walls 20 and 20' the plane's normal 77 meeting the circumference 31 at an acute angle. The rim joint plane is essentially vertical between the rim bed 19 and the spoke hole side 22 shown in FIG. 2.

The sockets 70 and 71 are inserted into the hollow section 16 shown in FIG. 10 and/or are inserted into the hollow sections partitioned by the reinforcing rib. They can be made to match the shape of the partitioned hollow sections enabling their installation by a pressed fit. The faces 72 and 73 and/or 74 and 75 of the sockets 70 or 71 are parallel with the plane of the rim joint 69. The rim joint 69 is shown to not be transverse with the sides of the rim, i.e. it is beveled. As a result, the cross section of the sockets 70 and 71 is shaped like a parallelogram, the longer sides being parallel to the rim side wall 20 or 20' and the reinforcing rib 57. The shorter sides, i.e., the faces, being located at an approximately equal distance from the rim joint plane 69.

For a hollow cross section rim 4 without reinforcing rib 57, i.e., the hollow section being a single unit, the socket is a one-piece element, as a rule.

We claim:

1. A wheel (1) for a bicycle (2) having a plurality of spokes (3) arranged between a circumferential rim (4) and a hub (5), having a first and a second disk cover (6) removably mounted thereto to cover the wheel laterally, said rim (4) being laterally provided with first and second circumferential catch grooves (7;7') for the respective disk cover (6) to be inserted in said groove;

said wheel further including a rim side wall (20), an inclined rim side wall (20'), and a spoke hole side (22), said first catch groove (7) being circumferentially located in the section between said rim side wall (20) and said spoke hole side (22), and said second catch groove (7') being circumferentially located in the section between said inclined rim side wall (20') and said spoke hole side (22);

said catch grooves (7,7') holding in place said respective disk cover (6) with an edge means (11) inserted under tension therein; and said catch groove (7') assigned to said inclined rim side wall (20'), is inclined outward at an angle (63) in relation to said catch groove (7) of said rim side wall (20).

2. The bicycle wheel of claim 1, wherein said angle (63) and the angle of inclination (62) are essentially equal.

3. In a wheel (1) for a bicycle (2)

a circumferential rim (4) having an outwardly facing bed for receipt of a tire, two oppositely disposed sidewalls and an inner wall opposite to said bed, said inner wall being equipped with a plurality of spoke holes, a hub (5) centrally disposed relative to said rim and equipped with a plurality of spoke holes, a plurality of spokes (3) extending between said rim and hub and being secured in said rim holes and hub holes, said hub, spokes and rim defining said wheel and with said wheel having sides, at least one catch groove (7) extending circumferentially in said rim inner wall adjacent said spoke holes and being open in the direction of said hub, a disk cover (6) covering one wheel side and having a circumferential edge means (11) received in said groove, said edge means exerting an outwardly directed tension;

said disk cover (6) consisting of an essentially circular hoop (11) and a cover (12) stretched over said hoop, an access opening (24) being provided in said disk cover (6) in the vicinity of a valve (25) into which an expanding means (26, 32, 34) is incorporated at least for expanding said hoop (11), said hoop having a gap (27), and said expanding means being movably interlocked with the free ends (28, 29) of said hoop (11) which confine said gap, said free ends (28, 29) are essentially bent inward in a radial direction and away from each other, and said expanding means (26, 32, 34) consists of an expanding wedge (34) slidingly arranged on said free ends.

4. The bicycle wheel of claim 3, and wherein an essentially U-shaped elastic frame 35 is provided to confine the access opening 24 in said disk cover 6, and said free ends (28, 29) of said hoop 11 are fed into said U-legs (36) of said frame, said expanding wedge 34 being slidingly arranged between said U-legs.

5. The bicycle wheel of claim 4, wherein said expanding wedge (34) and said U-legs (36) are provided with a tongue and groove interlock.

6. The bicycle wheel of claim 4, wherein said U-legs (36) are provided with a tongue (39) for fixing said expanding wedge (34) in its expanded position.

7. The bicycle wheel of claim 4, wherein said U-frame (35), said expanding wedge (34), said lid (40), and said valve (25) supply essentially the weight needed to balance the wheel which is unbalanced due to said rim joint.

8. The bicycle wheel of claim 4, wherein a lid (40) is pivotably fastened to the end 30 of said expanding wedge opposite said rim 4, said lid and said expanding wedge when in its expanded position sealing said access opening (24).

9. The bicycle wheel of claim 8, wherein said lid (40) and said expanding wedge (34) are arranged flush with said disk cover (6).

10. The bicycle wheel of said claim 8 or 9, wherein said lid 40 is provided with a snap nose (42) for engagement with the web (37) of said U-shaped frame (35).

11. The bicycle wheel of claim 8 or 9, wherein said lid is provided with a fingerhole (43).

12. The bicycle wheel of claim 8 or 9, wherein a spring element 44 is arranged between said lid 40 and said expanding wedge 34 for spring-actuated closing of said lid in a first direction (47).

13. The bicycle wheel of claim 4 or 8, wherein said valve access opening 24 is located diametrically opposed to the rim joint of said rim (4).

14. In a wheel (1) for a bicycle (2) having a plurality of spokes (3) arranged between a circumferential rim (4) and a hub (5), having at least one disk cover (6) removably mounted thereto to cover the wheel laterally, the improvement comprising the rim (4) being laterally provided with at least one circumferential catch groove 97) for the disk cover (6) to be inserted in said groove, said disk cover (6) consists of an essentially circular hoop (11) and a stretchable cover (12) over said hoop, said hoop is completely closed and is provided with an access dent (45) facing away from said catch groove (7) at least at one point.

15. In a wheel (1) for a bicycle (2)

a circumferential rim (4) having an outwardly facing bed for receipt of a tire, two oppositely disposed sidewalls and an inner wall opposite to said bed, said inner wall being equipped with a plurality of spoke holes, a hub (5) centrally disposed relative to said rim and equipped with a plurality of spoke holes, a plurality of spokes (3) extending between said rim and hub and being secured in said rim holes and hub holes, said hub, spokes and rim defining said wheel and with said wheel having sides, at least one catch groove (7) extending circumferentially in said rim inner wall adjacent said spoke holes and being open in the direction of said hub, a disk cover (6) covering one wheel side and having a circumferential edge means (11) received in said groove, said edge means exerting an outwardly directed tension;

said rim (4) has a beveled joint (69) defined by faces (72, 73) with said faces being parallel with the plane of the rim joint; and a joint plane (76) extends across said rim 4 between said rim side walls (20, 20') and said plane meets the circumference (31) at an acute angle.

16. The bicycle wheel of claim 15, wherein in the rim joint area (76) there is at least one socket (70, 71) inserted inside the hollow cross section (10) and extending essentially at an equal length to either side of said rim joint (76) in the direction of the circumference (31).

17. The bicycle wheel of claim 16, wherein the faces (72, 73, 74, 75) of said sockets (70, 71) are essentially parallel to said rim joint plane (76).

18. The bicycle wheel of claim 16, wherein one each of said sockets (70, 71) is inserted in one of the subsections obtained by dividing the hollow cross section by said reinforcing rib (57).

* * * * *